(12) United States Patent
Sakurai

(10) Patent No.: US 7,189,951 B2
(45) Date of Patent: Mar. 13, 2007

(54) SOLID-STATE IMAGE SENSING APPARATUS AND IMAGE SENSING SYSTEM

(75) Inventor: Katsuhito Sakurai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 10/408,300

(22) Filed: Apr. 7, 2003

(65) Prior Publication Data

US 2003/0189160 A1 Oct. 9, 2003

(30) Foreign Application Priority Data

Apr. 9, 2002 (JP) .............................. 2002-106507

(51) Int. Cl.
  *H01L 31/00* (2006.01)
  *H01L 31/062* (2006.01)
(52) U.S. Cl. ............................. 250/208.1; 250/214.1; 257/291; 257/292; 257/300
(58) Field of Classification Search ............ 250/208.1, 250/214.1, 214 R; 257/440, 458, 463
See application file for complete search history.

(56) References Cited

U.S. PATENT DOCUMENTS

| 4,677,289 A | 6/1987 | Nozaki et al. | |
|---|---|---|---|
| 5,631,704 A * | 5/1997 | Dickinson et al. | 348/308 |
| 5,844,431 A | 12/1998 | Chen | |
| 5,965,875 A | 10/1999 | Merrill | 250/226 |
| 6,791,613 B2 | 9/2004 | Shinohara et al. | |
| 6,801,255 B2 | 10/2004 | Inui | |
| 6,956,273 B2 * | 10/2005 | Koizumi | 257/440 |
| 6,960,757 B2 * | 11/2005 | Merrill et al. | 250/226 |
| 2003/0189159 A1 * | 10/2003 | Inoue | 250/208.1 |

FOREIGN PATENT DOCUMENTS

| JP | 06-052802 | 6/1986 |
|---|---|---|
| JP | 10-284714 | 10/1998 |
| JP | 11-103422 | 4/1999 |
| JP | 2000-078475 | 3/2000 |
| JP | 2001-245219 | 9/2001 |
| JP | 2001-245220 | 9/2001 |
| WO | WO 99/056097 | 11/1999 |

OTHER PUBLICATIONS

Office Action from Japanese Patent Office, dated Aug. 18, 2006, concerning Japanese Patent Application No. 2002-106507.

* cited by examiner

*Primary Examiner*—Stephone B. Allen
(74) *Attorney, Agent, or Firm*—Morgan & Finnegan, LLP

(57) ABSTRACT

A solid-state image sensing apparatus having plural unit pixels, arranged in an array, for converting incident light into signal charges and outputting the signal charges as electric signals, having plural photoelectric converters, overlay-formed in a depthwise direction, for converting the incident light into the electric signals. Differential processing is performed on output signals corresponding to the signal charges and output signals corresponding to a reset status and the result of processing is outputted.

17 Claims, 13 Drawing Sheets

SOLID-STATE IMAGE SENSING APPARATUS AND IMAGE SENSING SYSTEM

FIELD OF THE INVENTION

The present invention relates to an image sensing apparatus and more particularly, to a structure of an output system of a solid-state image sensing apparatus widely used in an image sensing system such as a video camera and a digital still camera.

BACKGROUND OF THE INVENTION

Conventionally, as a solid-state image sensing device used in an image sensing apparatus such as a digital camera, various proposals have been made so as to realize improvement in resolution and downsizing of the image sensing apparatus. One of such solid-state image sensing devices, U.S. Pat. No. 5,965,875 discloses a structure of a MOS type image sensing device capable of simultaneously obtaining respective R, G and B color components from respective pixels. Hereinbelow, the outline of the image sensing apparatus will be described.

FIG. 1 shows the structure of the solid-state image sensing device disclosed in U.S. Pat. No. 5,965,875, in which photodiodes of respective pixels are 3-layer structured diodes formed in a triple well structure. In FIG. 1, reference numeral 100 denotes a p-type silicon substrate (p-substrate); 102, an n-well formed on the silicone substrate 100; 104, a p-well formed on the n-well 102; 106, an n-region; and 108, a photoelectric current sensor having an ammeter 110 to detect a red (R) component current, an ammeter 112 to detect a green (G) component current and an ammeter 114 to detect a blue (B) component current.

As shown in FIG. 1, the photodiodes are formed as pn junction diodes in 3 layers in a depthwise direction by deeply forming n-type layer, p-type layer and n-type layer sequentially diffused from the surface of the p-type silicone substrate in this order. As light incident on the diodes from the surface side has a longer wavelength, the light enters into the diode deeper. As the incident wavelength and an attenuation coefficient show values inherent in silicon, the depth of the pn junction is designed such that the 3-layer structured photodiodes cover the respective wavelength bands (R, G and B) of visible light, and the electric currents are individually detected from the above-described 3-layer photodiode, thereby optical signals having different wavelength bands can be detected.

Further, the obtained 3 signals are subjected to operation processing and color signal separation, thereby an image can be reproduced.

Further, FIG. 2 shows a pixel-portion equivalent circuit utilizing the photodiodes shown in FIG. 1. In this equivalent circuit, electric signals from the respective photodiodes are outputted from 3 source followers.

In the conventional pixel-portion equivalent circuit in FIG. 2, as the 3 photodiodes are serially connected, 2 photodiodes except the R photodiode connected to the GND are influenced by voltages of the respective photodiodes. Further, as the 3 source followers have a threshold value which varies by pixel, fixed pattern noise occurs. Further, as spectral characteristics obtained by calculation from the structure and densities of the respective layers of the photodiodes overlay-formed in the depthwise direction in FIG. 1, are as shown in FIG. 3, spectral characteristics of general primary R, G and B colors cannot be obtained merely by forming the photodiodes having the structure as shown in FIG. 1.

SUMMARY OF THE INVENTION

The present invention provides a solid-state image sensing apparatus, in which plural unit pixels respectively to convert incident light into signal charges and output the signal charges as electric signals are arranged in an array, and the pixels respectively have plural photoelectric converters, overlay-formed in a depthwise direction, to convert the incident light to the electric signals, comprises differential processing unit adapted to perform differential processing on output signals corresponding to signal charges in the plural photoelectric converters and output signals corresponding to a reset status and outputting the result of processing.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 5:
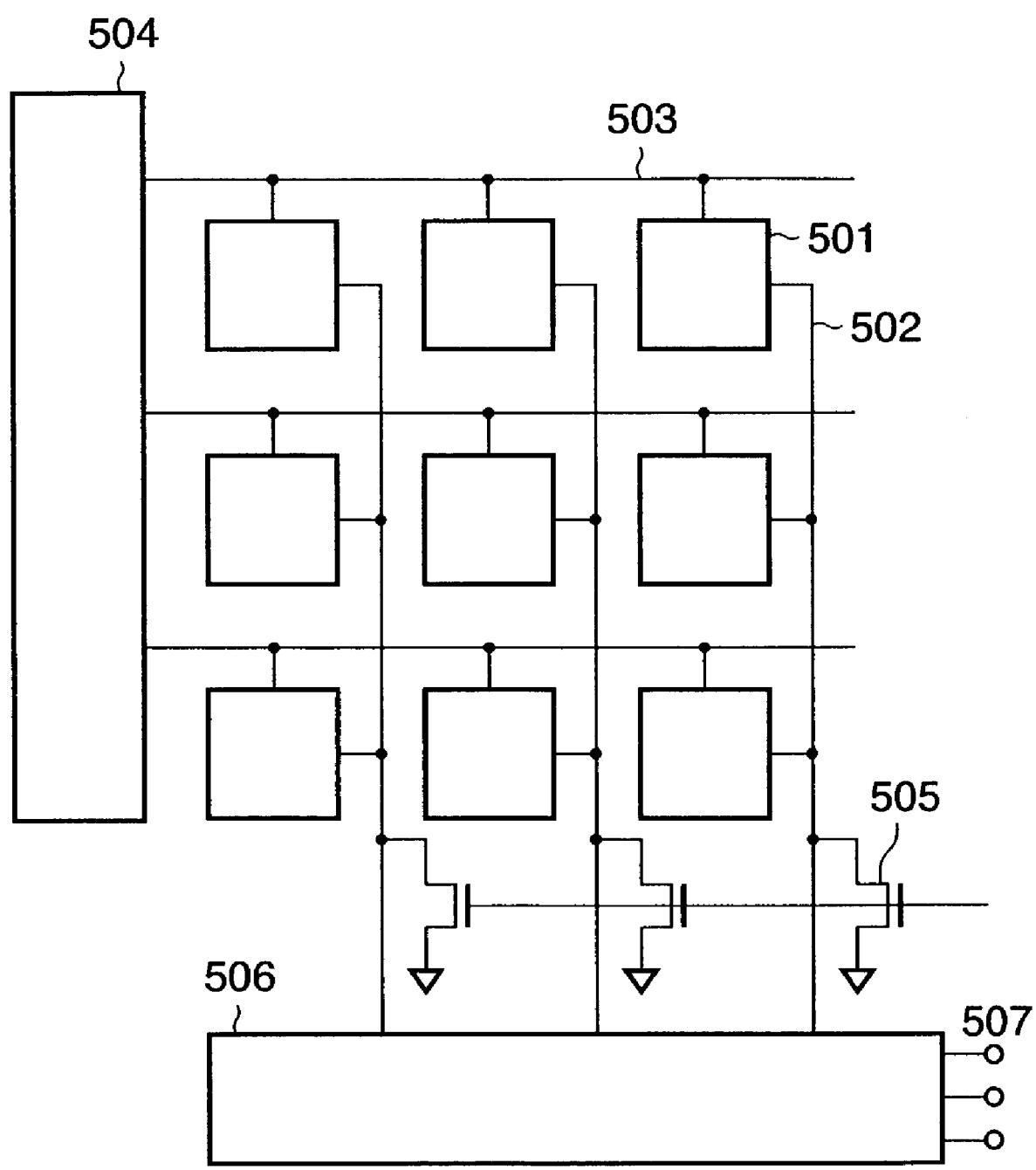
FIG. 5 is a block diagram showing an example of a construction of the solid-state image sensing apparatus of the present invention.

FIG. 5 is a block diagram schematically showing a CMOS sensor as a solid-state image sensing apparatus of the present invention. Numeral 501 denotes a pixel circuit, having photodiodes as photoelectric converters having the structure as shown in FIG. 1 and transistors for reading and resetting, arranged in a two-dimensional array in horizontal direction and vertical direction; 502, a vertical output line to which signals from the pixel circuit are outputted; 503, a signal line to transmit a voltage to the transistors in the pixel circuit; 504, a vertical scanning circuit which sequentially outputs a pulse in the vertical direction to the signal line 503; 505, a load transistor constituting the transistor (M4, M6 or M8) in the pixel circuit and a source follower circuit; 506, a reading circuit which reads noise signals and photoelectric conversion signals from the pixel circuit; and 507, an output terminal in which voltage outputs regarding respective R, G and B colors are obtained.

Figure 2:
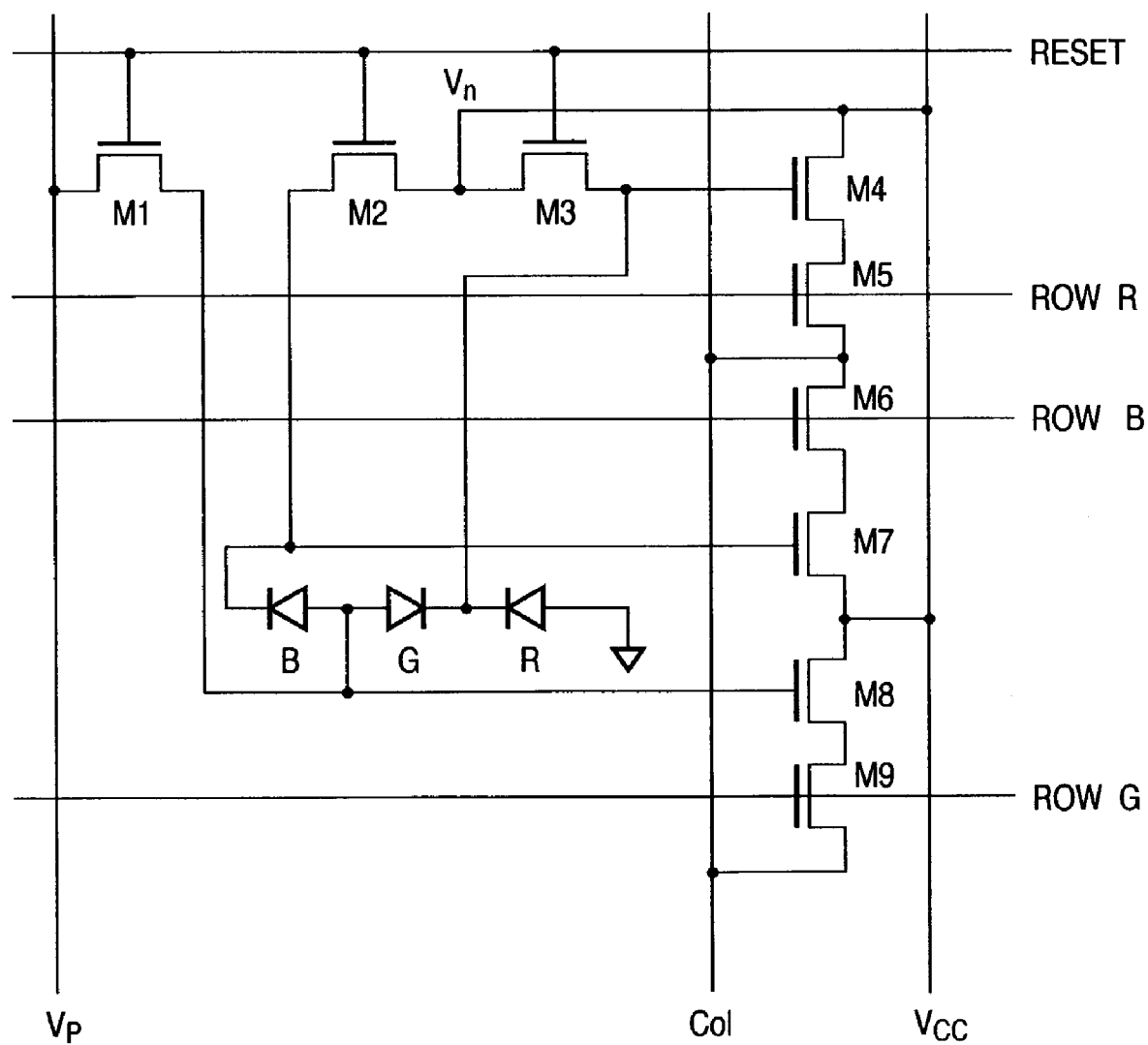
FIG. 2 is a schematic diagram showing the pixel portion equivalent circuit utilizing the solid-state image sensing device in FIG. 1.

Next, the operation in the pixel circuit will be briefly described. The pixel circuit 501, having a construction as shown in FIG. 2, reads respective R, G and B signals. As the basic control operation for the respective colors is the same, the case of R signal will be described. A charge storage node of the photodiode to output the R signal is reset to a predetermined potential when a transistor M3 is turned on by a RESET signal. At this time, as the RESET signal is also inputted to B and G signal reset transistors M1 and M2, the photodiodes for B and G signals are also reset.

When the reset transistors M1 to M3 have been closed and the resetting has been completed, storage of photoelectric charge is started in the respective photodiodes. When a predetermined period has elapsed from the start of storage, photoelectric-conversion signal potentials are transferred sequentially from the transistors M5, M9 and M6, to the reading circuit side. When the transfer has been completed, the reset transistors M1 to M3 are set to High to reset the photodiodes, and the reset potentials are read as noise signals to the reading circuit side.

Figure 1:
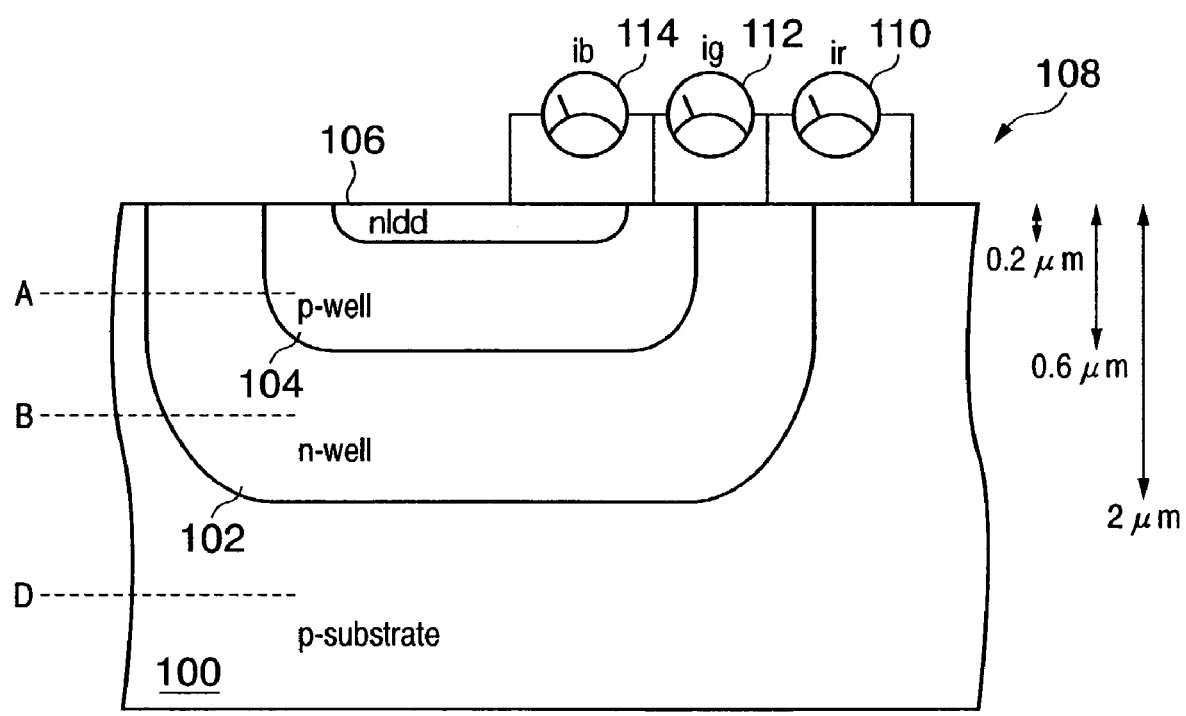
FIG. 1 is a schematic cross-sectional diagram showing the structure of the solid-state image sensing device disclosed in U.S. Pat. No. 5,965,875.
Figure 3:
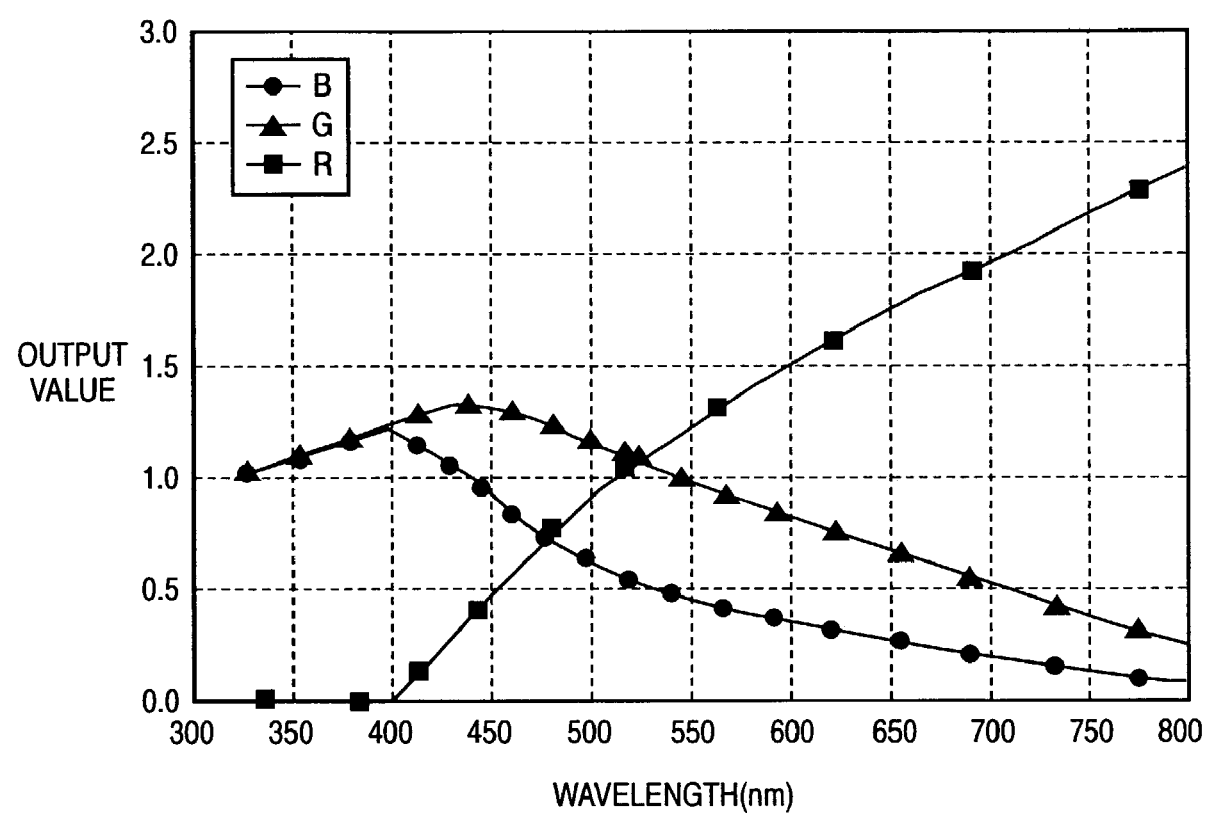
FIG. 3 is a graph showing the spectral characteristics in the conventional pixel circuit construction.

As described above, in the structure of photodiodes deposited in the depthwise direction as shown in FIG. 1 in U.S. Pat. No. 5,965,875, the spectral characteristics as shown in FIG. 3 are far from the general RGB spectral characteristics. FIG. 3 shows the simulation of signal values obtained by irradiation to the 3-layer structured photodiodes as shown in FIG. 1, in which the output values are directly obtained from the output circuits. Note that B indicates an output from the top layer photodiode; G, an output from an intermediate layer photodiode; and R, an output from the undermost layer photodiode.

Figure 4:
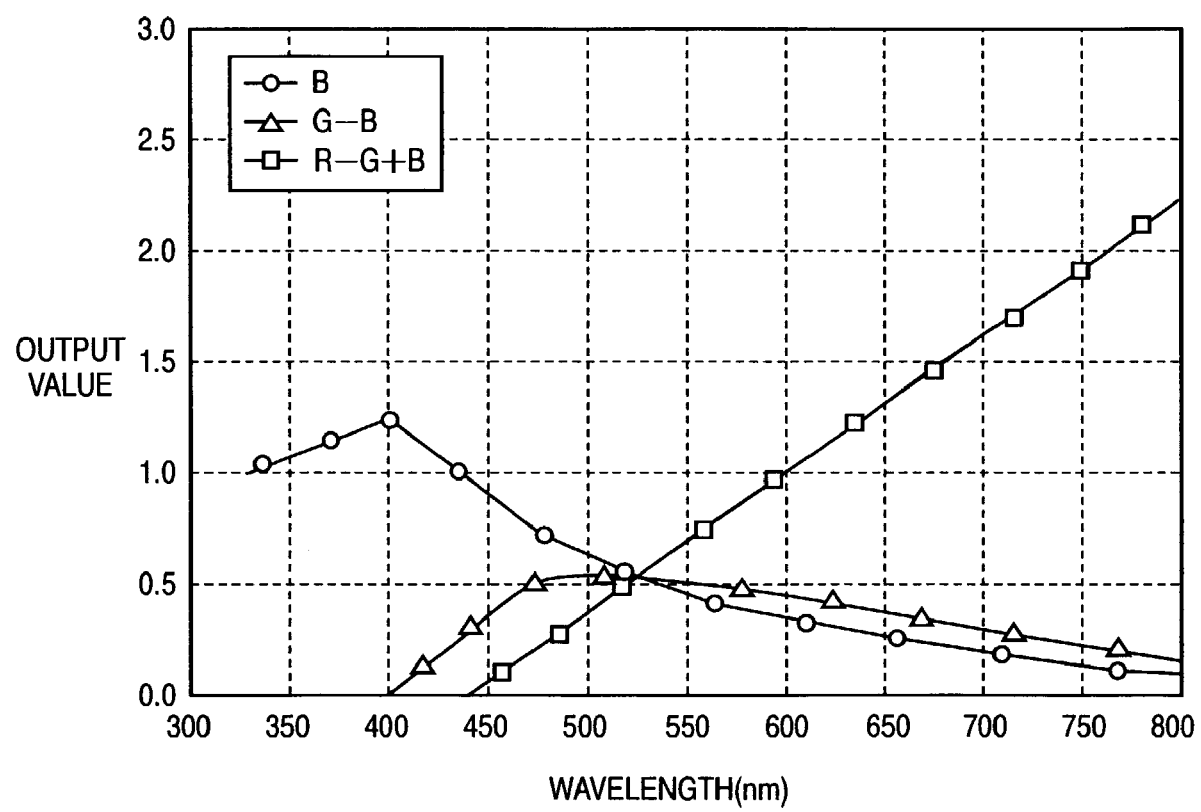
FIG. 4 is a graph showing an example of spectral characteristics of a solid-state image sensing apparatus of the present invention.

In the embodiments of the present invention to be described below, to improve the spectral characteristics, a reading circuit 6 obtains a first output signal (B) from a first photodiode formed in a position closest to the surface, a signal (G−B) obtained by subtracting the first output signal (B) from a second output signal (G) from a second photodiode formed in a position next closest to the surface, and a signal (R−G+B) obtained by subtracting the second output signal (G) from a third output signal (R) from a third photodiode formed in a deepest position (farthest from the surface) and adding the first output signal (B), thereby spectral characteristics as shown in FIG. 4 can be obtained. The above operations are made so as to separate a G component from the output from the photodiode G since the output has mixed G component and B component. At this time, as the stored charge in the photodiode G is positive holes while the stored charge in the photodiode B is negatrons, the adding of these outputs is substantially subtraction. Similarly, the G component is separated from the output from the photodiode R since color separation is poor in using the output as an R component signal.

First Embodiment

Figure 6:
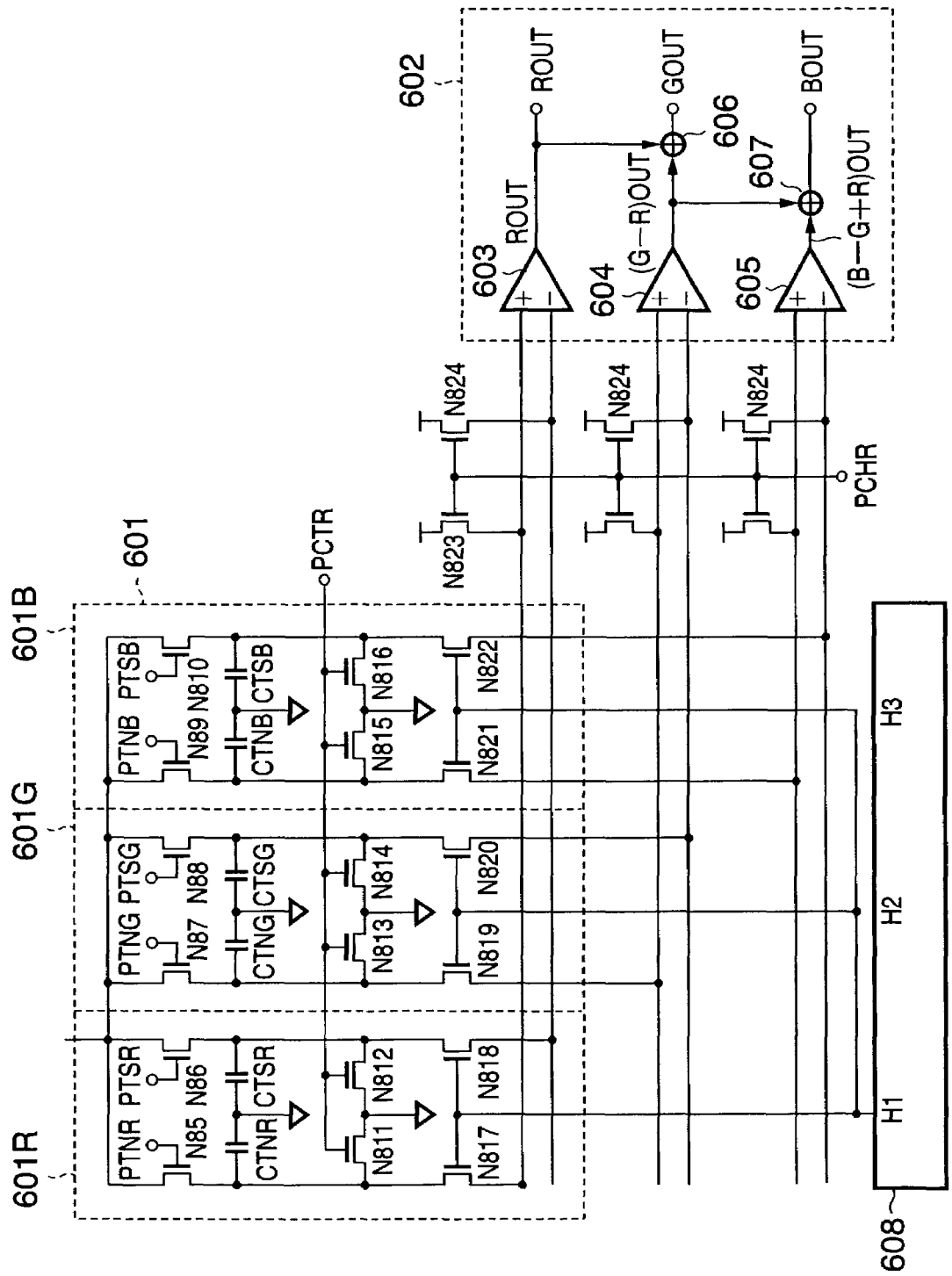
FIG. 6 is a schematic diagram showing a detailed construction of a reading circuit 506 according to a first embodiment of the present invention.

FIG. 6 is a schematic diagram showing a detailed construction of the reading circuit 506 in FIG. 5. The reading circuit 506 has a construction where a circuit block 601 provided for 1 pixel array is provided in correspondence with the number of pixel arrays. When 1 line is selected by the vertical scanning circuit 504, signals from the selected pixel are read in parallel to the array of the circuit block 601, and processed. The outputs from the circuit block 601 are inputted into differential amplifiers 603 to 605. The circuit block 601 has an R signal circuit 601R, a G signal circuit 601G and a B signal circuit 601B. As the respective signal circuits 601R to 601B have the same construction, the circuit 601R will be described. The circuit 601R has a holding capacitor CTSR for storage of photoelectric conversion signal and a holding capacitor CTNR for storage of noise signal. The signal storage is performed when transistors N85 and N86 are turned on in correspondence with the change of PTSR signal and PRNR signal from Low to High.

Further, as preprocessing for storage of signal value, the respective capacitors CTSR and CTNR are reset by transistors N823 and N824 and a PCTR signal. Further, the potentials of the respective capacitors CTSR and CTNR are inputted into the differential amplifier 603 when transistors N817 and N818 are released by an output signal H1 from a horizontal scanning circuit 608, and a noise component is eliminated from the photoelectric conversion signal by differential processing.

In the photodiodes having a structure as shown in FIG. 1, as the R photodiode is connected to the GND and is not influenced by voltages of the other photodiodes, the R signal is not processed and outputted from the differential amplifier 603. However, the photodiode G is influenced by a voltage from the photodiode R, the G−R signal is outputted from a differential amplifier 604. In an operation circuit 606, a G signal value, obtained by adding the R signal to the output signal from the differential amplifier 604 thereby eliminating the influence of the R signal, to an output terminal Gout. Similarly, as an output from a differential amplifier 605 is influenced by a voltage from the photodiode G (B−G+R), a B signal is outputted by adding the output from the differential amplifier 604 by utilizing an operation circuit 607. Note that the G signal has an opposite polarity to that of the R and B signals, the output from the differential amplifier can be simply added.

Figure 7:
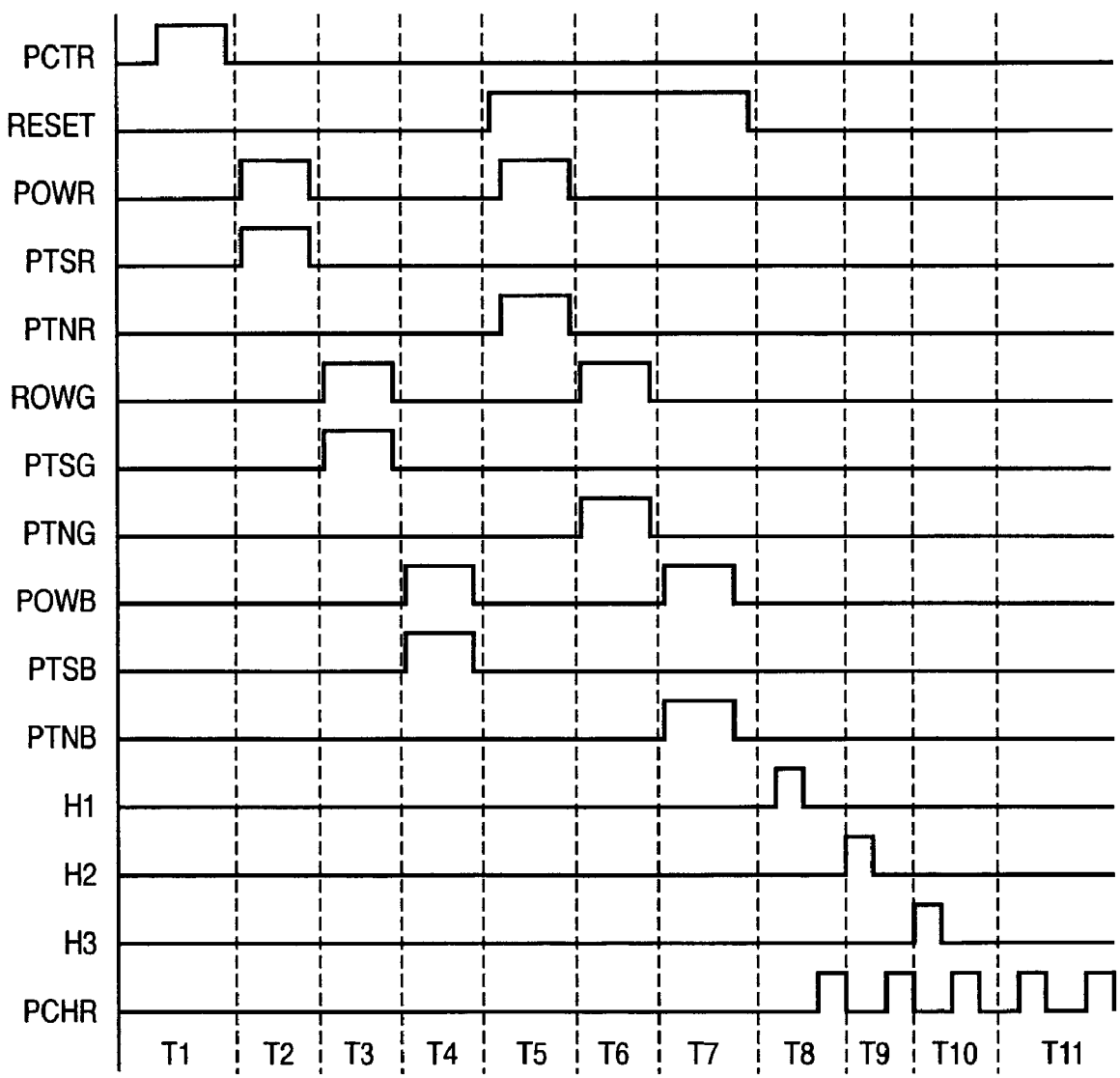
FIG. 7 is a timing chart of control according to the first embodiment of the present invention.

FIG. 7 is a timing chart of control in a case where the noise components are eliminated from the photoelectric conversion signals in accordance with the capacitance differential method by using the reading circuit as shown in FIG. 6.

First, at T1, the PCTR signal is set to High to reset the holding capacitors CTSR and CTNR. Next, at T2, a row selection signal ROWR and the PTSR signal are set to High to store the photoelectric conversion signal potential in the photodiode R into the holding capacitor CTSR. At T3 and T4, similarly, the photoelectric conversion signal potentials in the photodiode G and the photodiode B are stored into the holding capacitors CTSG and CTSB.

Next, in a status where a RESET signal is High, the photodiode R is reset at T5, and the potential of the noise signal in the photodiode R is stored into the holding capacitor CTNR. Similarly, at T6 and T7, the potentials of the noise signals in the photodiode G and the photodiode B are stored into the holding capacitors CTNG and CTNB.

Next, the process moves to a reading operation. At T8, the output H1 from the horizontal scanning circuit 608 becomes High, and the charges in the holding capacitors CTSR and CTNR, CTSG and CTNG, and CTSB and CTNB, are transferred to the corresponding differential amplifiers 603 to 605, and the differential processing is performed. Further, when the output H1 becomes Low, a signal PCHR is set to High, to reset horizontal output lines to the differential amplifiers. At T9 and thereafter, an image signal is outputted by performing processing similar to that at T8 with respect to an array corresponding to an output from the horizontal scanning circuit. Further, an image signal for 1 frame can be read by processing for 1 line is repeated for a predetermined number of lines.

Second Embodiment

Figure 8:
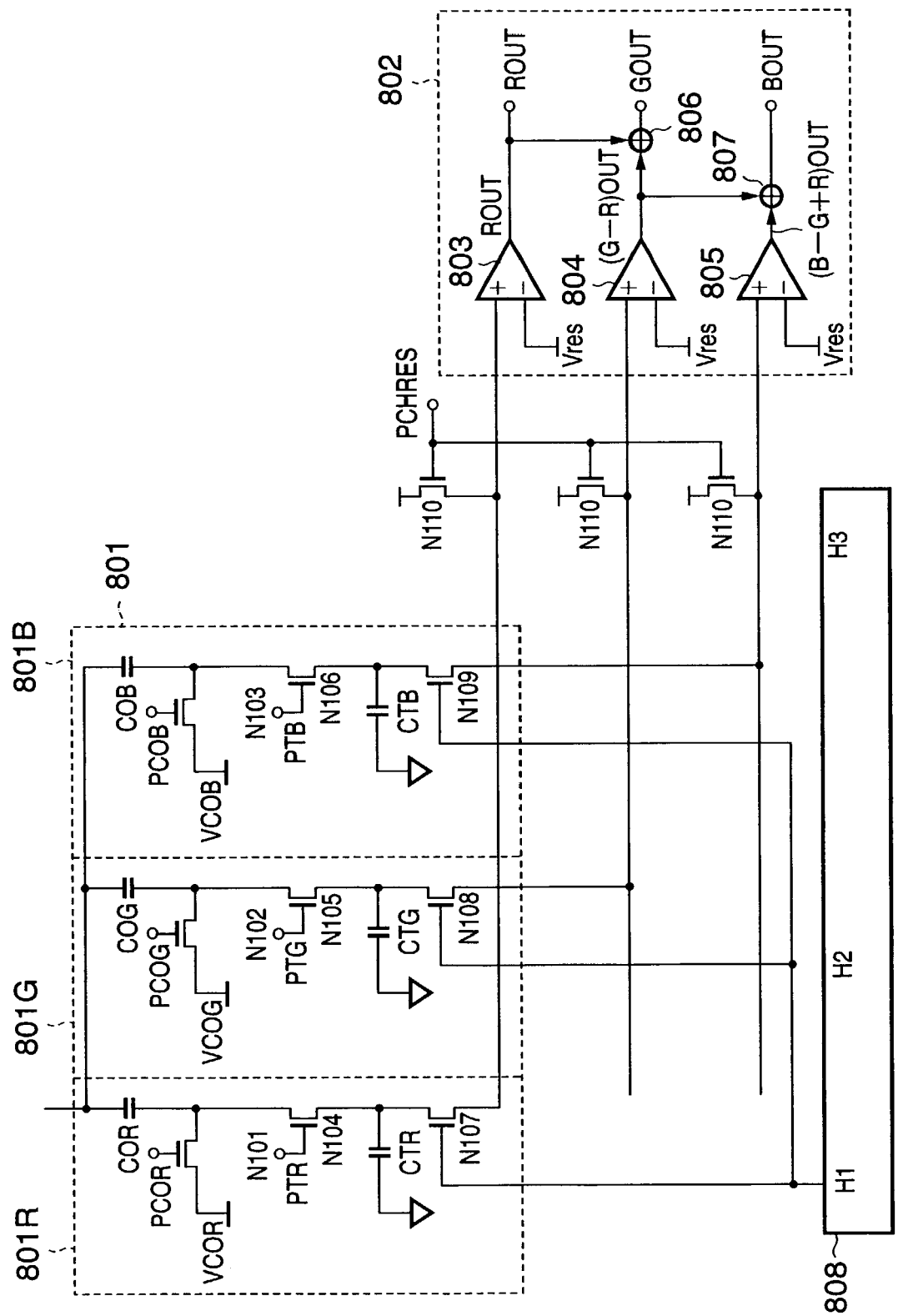
FIG. 8 is a schematic diagram showing the detailed construction of the reading circuit 506 according to a second embodiment of the present invention.

FIG. 8 is a schematic diagram showing another construction of the reading circuit 506 in FIG. 5. In the reading circuit 506, a circuit block 801 provided for 1 pixel array is provided in correspondence with the number of pixel arrays. When 1 line is selected by the vertical scanning circuit 504 in FIG. 5, signals of the selected pixel are read in parallel to the array of the corresponding circuit block 801 and processed. Outputs from the circuit block 801 are inputted to differential amplifiers 803 to 805. The circuit block 801 has an R signal circuit 801R, a G signal circuit 801G and a B signal circuit 801B. As the RGB signal circuits 801R to 801B have the same construction, the construction of the R signal circuit 801R will be described. Numeral COR denotes a clamp capacitor to clamp a pixel output; N101, a MOS switch for clamp operation; VC0R, a clamp potential; CTR, a capacitor for storage of signal voltage; N104, a switch MOS transistor for electrical connection between the clamp capacitor COR and the storage capacitor CTR; PTR, a terminal to apply a pulse to the gate of the transistor N104; and N107, a MOS transistor which receives an output from a horizontal scanning circuit 808 by its gate and transfers a signal stored in the storage capacitor CTR.

Figure 9:
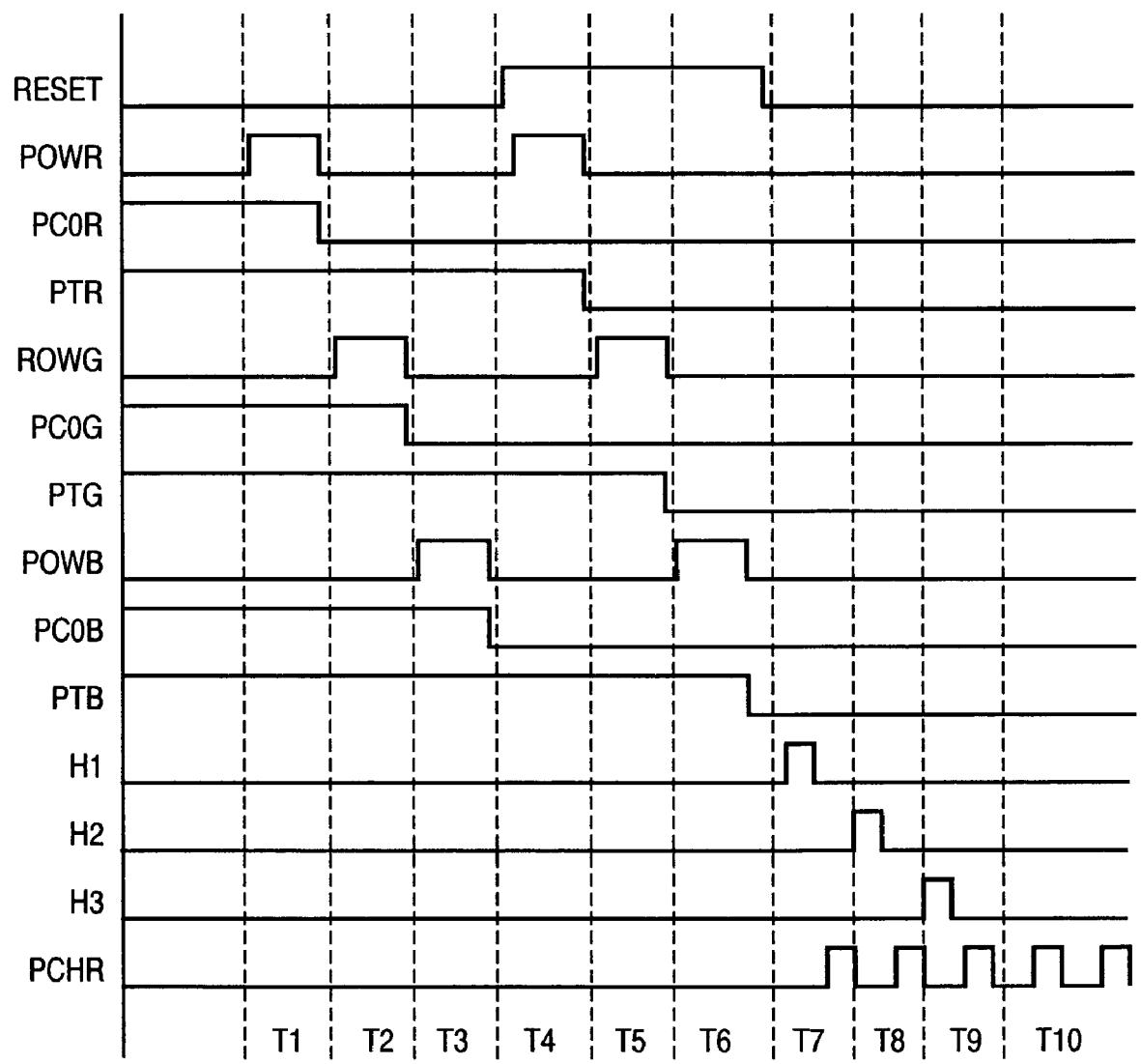
FIG. 9 is a timing chart of the control according to the second embodiment of the present invention.

The operation of the reading circuit in FIG. 8 will be described below with reference to the timing chart of FIG. 9. As in the case of the first embodiment, the pixel circuit 501 sequentially outputs a photoelectric conversion signal with a signal charge transferred at the reset level, and a noise signal. First, at T1, when the row selection signal ROWR becomes High, signal output regarding the photodiode R is made from the pixel circuit 501. A High level potential is applied to PCOR and the terminal PTR so as to turn the transistors N101 and N104 on, to set the electric potentials of the clamp capacitor COR and the storage capacitor CTR to the clamp potential. The R signal is clamped in the clamp capacitor COR by turning the PCOR to Low in a status where signal output is made from the pixel circuit 501. Similar operations are performed regarding the photodiodes G and B at T2 and T3.

Next, at T4, the RESET signal becomes High, and the pixel circuit 501 outputs a noise signal regarding the photodiode R, thereby the amount of change from the potential clamped in the capacitor CTR to the reset potential appears through the clamp capacitor COR. In this status, PTB is turned to Low so as to hold the voltage of the capacitor CTR. Similar operations are performed regarding outputs regarding the photodiodes G and B at T5 and T6. As in the case of the first embodiment, at T7 and thereafter, the control moves to the reading operation.

Note that the signals inputted into the differential amplifiers 803 to 805 are the respective signals stored in the capacitors CTR, CTG and CTB, and the noise signals are already eliminated. Accordingly, different from the first embodiment, the signals are inputted into positive-phase input terminals of the differential amplifiers 803 and 805, and inputted into reverse-phase input terminals of the differential amplifier 804, and a predetermined reference voltage is inputted to the other input terminals, then the differential processing is performed.

Third Embodiment

Figure 10:
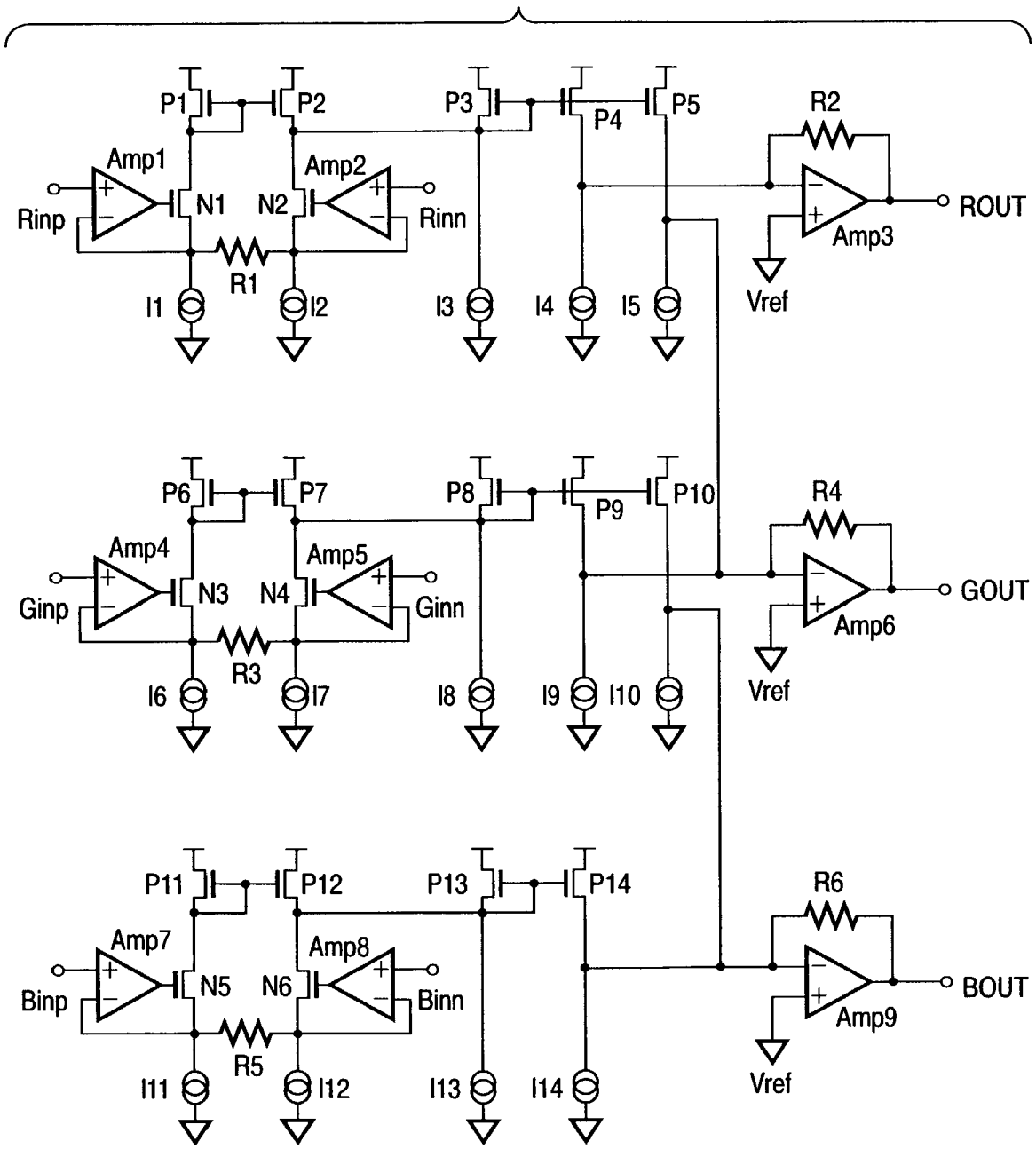
FIG. 10 is a schematic diagram showing an example of a construction of a signal processing circuit according to a third embodiment of the present invention.

FIG. 10 is a schematic diagram showing an example of constructions of the signal processors 602 and 802 surrounded with a dotted line in FIGS. 6 and 8.

An input Rinp to an amplifier Amp1 corresponds to the positive phase of the differential amplifier 603 in FIGS. 6 and 8, and an input Rinn to an amplifier Amp2, to the reverse phase of the differential amplifier 603 in FIGS. 6 and 8. That is, the noise signal from the photodiode R is inputted into the input Rinp, and the photoelectric conversion signal is inputted into the input Rinn. The inputs are similarly made regarding the photodiode B, however, regarding the photodiode G, as the polarity is opposite, the photoelectric conversion signal is inputted into an input Ginp, and the noise signal is inputted into an input Ginn.

Note that numerals Amp1 to Amp8 denote gm amplifiers. The amplifiers Amp1 and Amp2 have a source follower circuit and a voltage follower circuit constituted with transistors N1 and N2 and constant current source I1 and I2. In this construction, a potential difference applied to a resistor R1 corresponds to the potential difference between the inputs Rinp and Rinn to the amplifiers Amp1 and Amp2, and an electric current corresponding to the potential difference flows through the resistor R1. By this arrangement, a drain current at the transistors N1 and N2 is determined, and the current becomes an input to the current differential amplifier Amp3 via a current mirror circuit constituted with transistors P3 and P4, then converted to a voltage, and an output signal is obtained from the output terminal Rout.

As described above, as the photodiode R is connected to the GND, a source current from the current mirror is converted to a voltage without any conversion. Regarding the photodiodes G and B, to eliminate the influence of the other color components, as described above, current addition is performed by utilizing the source current from the current mirror and then the current is converted to a voltage.

In this manner, the difference voltage is converted to a current and the output from the differential processing is used as a current output. The above-described operation processing is performed by current addition/subtraction, and the current is converted to a voltage and outputted. Accordingly, an in-phase signal elimination ratio (CMRR) can be increased in comparison with a differential amplifier using a general operation amplifier, and a noise elimination rate can be increased.

Fourth Embodiment

Since the operation processing in the above embodiment is performed so as to eliminate the influence of the signal voltage of the photodiode R from the signals of the photodiodes G and B, voltages are handled in the processing. On the other hand, in the operation processing to improve spectral characteristics, signal charges obtained from the respective photodiodes must be handled. As the respective photodiodes overlay-formed in the depthwise direction have different junction areas, charge conversion coefficients upon conversion of the respective signal charges to voltages are different. Accordingly, in the present embodiment, the charge conversion coefficients of the respective photodiodes are previously stored in storage device, gain control is performed by a GCA (Gain Control Amplifier) with the stored values, and the above operation processing is performed, thereby spectral characteristics as shown in FIG. 12 can be obtained with accuracy.

Figure 11:
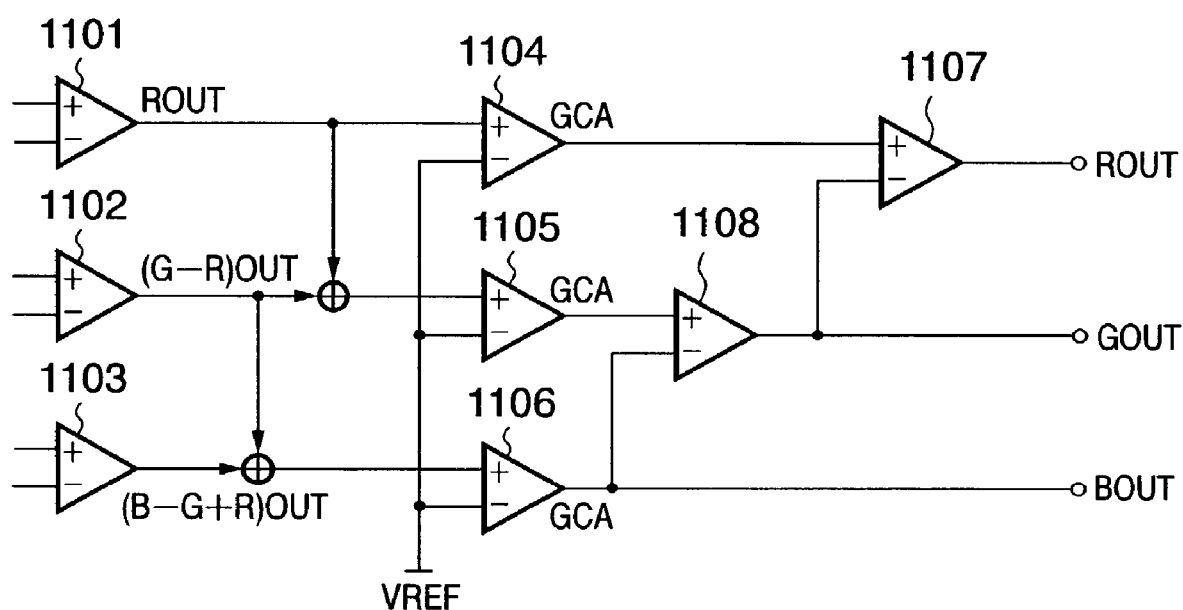
FIG. 11 is a schematic diagram showing an example of the construction of the signal processing circuit according to a fourth embodiment of the present invention.

FIG. 11 is a schematic diagram showing an example of the construction of the signal processing circuits 602 and 802 in FIGS. 6 and 8 according to the fourth embodiment. In this construction, the gain control is performed by inputting values resulted from addition of outputs from differential amplifiers 1101 to 1103 into GCAs 1104 to 1106. After the gain control, regarding the photodiode B, a voltage value after the control is outputted to the Bout. On the other hand, regarding the photodiode G, an output signal from the GCA 1106 is inputted into the reverse phase of a differential amplifier 1108. That is, the B signal component is eliminated from the G signal, thereby a signal output to the output Gout is obtained. Further, an output from the differential amplifier 1108 is inputted into the reserve phase of a differential amplifier 1107. The G signal component is eliminated from the R signal, and the R signal is outputted from the output terminal Rout.

Figure 12:
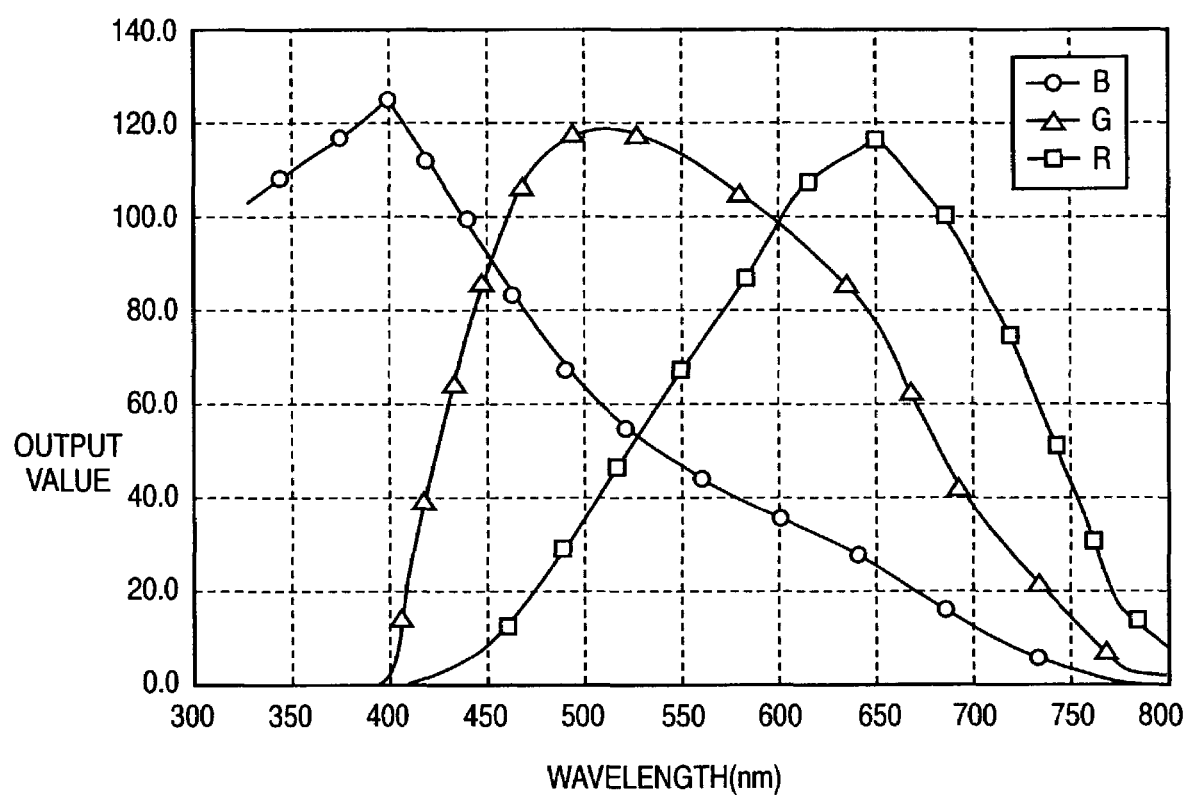
FIG. 12 is a graph showing the spectral characteristics obtained by a circuit construction corresponding to the fourth embodiment of the present invention.

By the above processing, the spectral characteristics as shown in FIG. 12 can be obtained. That is, the spectral characteristics in FIG. 12 are obtained by performing gain-control on the spectral characteristics as shown in FIG. 4 such that the characteristics have the same peak value, and passing them through a infrared filter. The spectral characteristics in FIG. 12 are close to general primary RGB spectral characteristics.

Fifth Embodiment

Next, an image input apparatus using the solid-state image sensing apparatus described in the above first to fourth embodiments will be described. The image input apparatus includes a digital still camera, a digital video camera, a scanner and the like. Hereinbelow, a still camera will be mainly described. The following description is an example of the image input apparatus, and application of the technique described here to other image input apparatuses is a merely general technical activity by a person skilled in the art without departing from the spirit of the present invention. The other apparatuses belong to the technical scope of the present invention.

Figure 13:
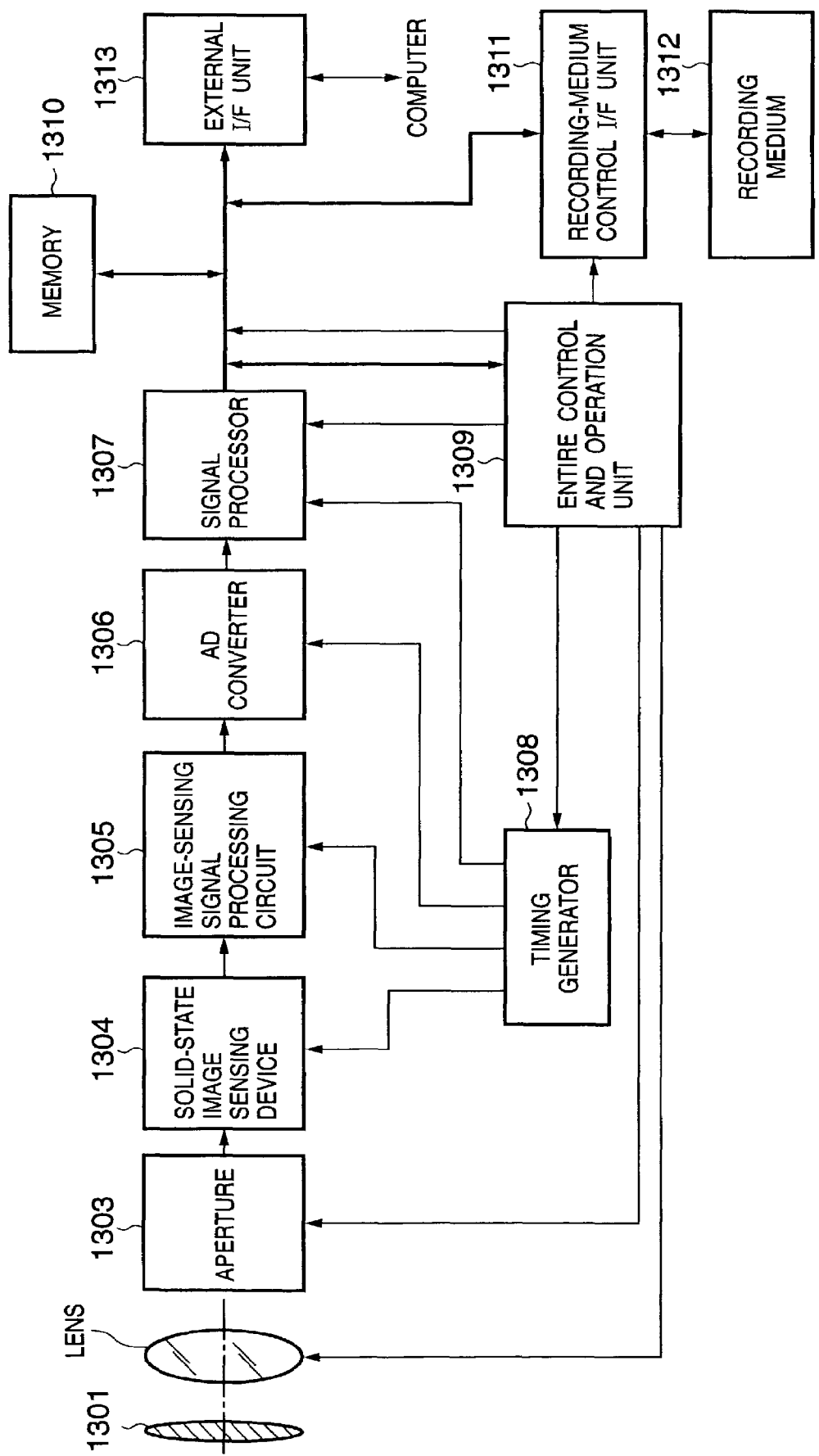
FIG. 13 is a block diagram showing a construction of an image sensing system according to a fifth embodiment of the present invention.

In FIG. 13, numeral 1301 denotes a barrier which protects a lens and which serves as a main switch; 1302, a lens which forms an optical image of a subject on an image sensing apparatus 1304; 1303, an aperture for variably controlling the amount of light passed through the lens 1302; 1304, a solid-state image sensing device (corresponding to the image sensing apparatus described in the above first to third embodiments) which inputs the optical image of the subject image-formed by the lens 1302 as an image signal; 1305, an image-sensing signal processing circuit including a gain-variable amplifier to amplify the image signal outputted from the image sensing device 1304 and a gain control circuit for correcting a gain value; and 1306, an A/D converter which performs analog-digital conversion on the image signal outputted from the image sensing device 1304.

Further, numeral 1307 denotes a signal processor which performs various corrections on the image data outputted from the A/D converter 1306 or compresses the data; 1308, a timing generator which outputs various timing signals to the image sensing device 1304, the image-sensing signal processing circuit 1305, the A/D converter 1306 and the signal processor 1307; 1309, an entire control and operation unit which performs various operations and controls the entire still video camera; 1310, a memory for temporarily storing the image data; 1311, a recording-medium control interface unit for recording on/reading from a recording medium; 1312, a removable recording medium such as a semiconductor memory for recording or reading of image data; and 1313, an interface unit for communication with an external computer or the like.

Next, the operation of the still video camera having the above construction upon image sensing will be described. When the barrier 1301 is opened, a main power source is turned on, then a power source of a control system is turned on, and further, a power source of image-sensing system circuit such as the A/D converter 1306 is turned on.

Thereafter, to control an exposure amount, the entire control and operation unit 1309 releases the aperture 1303. A signal outputted from the solid-state image sensing device 1304 is converted by the A/D converter 1306, and inputted into the signal processor 1307. The entire control and operation unit 1309 performs photometry based on the data resulted from a predetermined signal processing by the signal processor 1307, determines brightness based on the result of photometry, and calculates an exposure amount. Then the entire control and operation unit 1309 controls the aperture 1303 in correspondence with the obtained exposure.

Next, the entire control and operation unit 1309 extracts a high frequency component based on a signal outputted from the image sensing device 1304 and calculates a distance to the subject. Thereafter, the entire control and operation unit 1309 drives the lens and determines whether or not an in-focus status has been obtained. If the entire control and operation unit 1309 determines that an in-focus status has not been obtained, the unit drives the lens again and performs photometry. When an in-focus status has been determined, main exposure is started.

When the exposure has been completed, the image signal outputted from the image sensing device 1304 is A/D converted by the A/D converter 1306, then passed through the signal processor 1307, and written into the memory 1310 by the entire control and operation unit 1309.

Thereafter, the data stored in the memory 1310 is recorded on the removable recording medium 1312 such as a semiconductor memory through the recording-medium control I/F unit 1311.

Further, it may be arranged such that the image data is directly inputted into a computer or the like through the external I/F unit 1313 and is processed.

As described above, as an output signal corresponding to a signal charge and an output signal corresponding to a reset status are subjected to differential processing, fixed pattern noise, due to variation in threshold values of the source followers formed in respective pixels to read signal charges in the respective photodiodes for respective pixels, can he eliminated.

Further, as a holding capacitor for 1 line to hold the output signal corresponding to a signal charge and an output signal corresponding to a reset status is provided for the respective photodiodes overlay-formed in the depthwise direction, and the signals are time-sequentially outputted in parallel to plural common output lines, the outputs from the plural photodiodes can be simultaneously outputted, and signals in reaction to plural types of wavelength bands (e.g., primary R, G and B signals) can be simultaneously obtained. Accordingly, image processing can be easily performed.

Further, output signals from the plural photodiodes overlay-formed in the depthwise direction and serially arrayed are influenced by potentials of adjacent photodiodes except a photodiode with one terminal fixed to an absolute potential (e.g., GND). In the present invention, SN can be improved by performing operations to eliminate the influence within the same chip.

Further, in the reading circuit for reading of pixel signals, the difference voltage is converted to a current and the output from the differential processing is used as a current output. The above-described operation processing is performed by current addition/subtraction, and the current is converted to a voltage and outputted. Accordingly, an in-phase signal elimination ratio (CMRR) can be increased in comparison with a differential amplifier using a general operation amplifier, and a noise elimination rate can be increased.

Further, in the respective photodiodes overlay-firmed in the depthwise direction, even if the charge conversion coefficients upon conversion of respective signal charges to voltages are different since the junction areas are different, the charge conversion coefficients of the respective photodiodes are previously stored in storage device, gain control is performed by the GCA (Gain Control Amplifier) based on the stored values and a predetermined operation processing is performed, thereby spectral characteristics close to general primary RGB spectral characteristics can be obtained with accuracy.

Accordingly, an excellent image signal can be obtained.

The present invention is not limited to the above embodiments and various changes and modifications can be made within the spirit and scope of the present invention. Therefore, to appraise the public of the scope of the present invention, the following claims are made.

What is claimed is:

1. A solid-state image sensing apparatus comprising:
   a plurality of unit pixels arranged in an array, for converting incident light into signal charges and outputs the signal charges as electric signals, wherein said unit pixel comprises a plurality of photoelectric converters, overlay-formed in a depthwise direction, that convert the incident light to the signal charges; and
   a differential processing unit adapted to perform a differential processing on output signals corresponding to signal charges in said plurality of photoelectric converters and output signals corresponding to a reset status and outputting signals obtained by the differential processing, wherein said differential processing unit having;
   a first holding capacitor that holds the output signals corresponding to the signal charges provided for an output line; and
   a second holding capacitor that holds the output signals corresponding to said reset status provided for said output line,
   wherein a plurality of difference signals between the signals held in said first and second holding capacitors are time-sequentially outputted.

2. The solid-state image sensing apparatus according to claim 1, wherein said first and second holding capacitors for said output line are provided by each photoelectric converter of said plurality of photoelectric converters, and
   wherein the output signals by each of said plurality of photoelectric converter are time-sequentially read out in parallel onto a plurality of common output lines.

3. The solid-state image sensing apparatus according to claim 1, wherein the number of said plurality of photoelectric converters is 3.

4. An image sensing system comprising:
   the solid-state image sensing apparatus according to claim 1;
   an A/D converter that converts a signal from the solid-state image sensing apparatus into a digital signal;
   a signal processing circuit that performs signal processing on the digital signal from said A/D converter; and
   a lens that forms an optical image on the solid-state image sensing apparatus.

5. The solid-state image sensing apparatus according to claim 1, further comprising:
   a plurality of holding units that hold the electric signals from said plurality of unit pixels; and
   a common output unit, provided in common to said plurality of holding units, that sequentially outputs the signals from said plurality of holding units,
   wherein said plurality of holding units respectively have a plurality of holding capacitors, a first holding capacitor of said plurality of holding capacitors holding the output signals corresponding to the signal charges provided for an output line and a second holding capacitor of said plurality of holding capacitors holding the output signals corresponding to said reset status provided for said output line, and said common output unit has a plurality of common output lines to output the signals from said plurality of holding capacitors in parallel, and
   wherein the solid-state image sensing apparatus has an operation processor adapted to receive signals from said plurality of common output lines in parallel and performing operation processing.

6. The solid-state image sensing apparatus according to claim 5, wherein said operation processing is converting the output signals from said plurality of photoelectric converters into a first current then performing addition/subtraction processing on said first current, then converting a second current obtained by said addition/subtraction processing into a voltage and outputting the voltage.

7. An image sensing system comprising:
   the solid-state image sensing apparatus according to claim 5;
   an A/D converter that converts a signal from the solid-state image sensing apparatus into a digital signal;
   a signal processing circuit that performs signal processing on the digital signal from said A/D converter; and
   a lens that forms an optical image on the solid-state image sensing apparatus.

8. A solid-state image sensing apparatus comprising:
   a plurality of unit pixels arranged in an array, for converting incident light into signal charges and outputs the signal charges as electric signals, wherein said unit pixel comprises a plurality of photoelectric converters, overlay-formed in a depthwise direction, that convert the incident light to the signal charges; and
   a differential processing unit adapted to perform a differential processing on output signals corresponding to signal charges in said plurality of photoelectric converters and output signals corresponding to a reset status and outputting signals obtained by the differential processing,
   wherein said differential processing unit comprises a clamp capacitor provided for an output line for clamping the output signals corresponding to the signal charges,
   and holding the output signals corresponding to said reset status by a holding capacitor via said clamp capacitor provided for said output line, further, time-sequentially outputs the signal held in said holding capacitor.

9. The solid-state image sensing apparatus according to claim 8, wherein the number of said plurality of photoelectric converters is 3.

10. A solid-state image sensing apparatus according to claim 8, further comprising:
    a plurality of holding units that hold the electric signals from said plurality of unit pixels; and
    a common output unit, provided in common to said plurality of holding units, that sequentially outputs the signals from said plurality of holding units,
    wherein said plurality of holding units respectively have a plurality of holding capacitors, and said common output unit has a plurality of common output lines to output the signals from said plurality of holding capacitors in parallel, and
    wherein the solid-state image sensing apparatus has an operation processor adapted to receive signals from said plurality of common output lines in parallel and perform operation processing.

11. An image sensing system comprising:
the solid-state image sensing apparatus according to claim 8;
an A/D converter that converts a signal from the solid-state image sensing apparatus into a digital signal;
a signal processing circuit that performs signal processing on the digital signal from said A/D converter; and
a lens that forms an optical image on the solid-state image sensing apparatus.

12. A solid-state image sensing apparatus having a plurality of unit pixels, arranged in an array, for converting incident light into signal charges and outputting the signal charges as electric signals, wherein each unit pixel having a plurality of photoelectric converters, overlay-formed in a depthwise direction, for converting the incident light into the signal charges, comprising:
a gain controller adapted to perform gain control on output signals from said plurality of photoelectric converters to obtain equal charge conversion coefficients;
an operation processor adapted to perform predetermined operation processing on said output signals gain-controlled by said gain controller; and
an output unit adapted to output a result of processing by said operation processor.

13. The solid-state image sensing apparatus according to claim 12, wherein said plurality of photoelectric converters are at least first to third photoelectric converters from a surface in the depthwise direction, and
wherein said operation processor outputs a first output signal from a first photoelectric converter without any operation, subtracts said first output signal from a second output signal from said second photoelectric converter and outputs a result of subtraction, and subtracts said second output signal from a third output signal from said third photoelectric converter to obtain a second result of subtraction, and adds said first output signal to the second result of subtraction, and outputs a result of addition.

14. An image sensing system comprising:
the solid-state image sensing apparatus according to claim 12;
an A/D converter that converts a signal from the solid-state image sensing apparatus into a digital signal;
a signal processing circuit that performs signal processing on the digital signal from said ND converter; and
a lens that forms an optical image on the solid-state image sensing apparatus.

15. A solid-state image sensing apparatus having a plurality of unit pixels, arranged in an array, for converting incident light into signal charges and outputting the signal charges as electric signals, wherein each unit pixel having a plurality of photoelectric converters, overlay-formed in a depthwise direction, for converting the incident light into the signal charges, comprising:
a differential processing unit adapted to perform differential processing on output signals corresponding to signal charges in said plurality of photoelectric converters and to output reset signals corresponding to a reset status, and outputting difference signals obtained by the differential processing;
a gain controller adapted to perform gain control on said difference output signals regarding said plurality of photoelectric converters, outputted from said differential processing unit, to obtain equal charge conversion coefficients; and
an operation processor adapted to perform predetermined operation processing on said difference output signals gain-controlled by said gain controller and outputting a result of said operation processing.

16. An image sensing system comprising:
the solid-state image sensing apparatus according to claim 15;
an ND converter that converts a signal from the solid-state image sensing apparatus into a digital signal;
a signal processing circuit that performs signal processing on the digital signal from said ND converter; and
a lens that forms an optical image on the solid-state image sensing apparatus.

17. A solid-state image sensing apparatus comprising:
a plurality of unit pixels arranged in an array, for converting incident light into signal charges and outputs the signal charges as electric signals, wherein said unit pixel comprises a plurality of photoelectric converters, overlay-formed in a depthwise direction, that convert the incident light to the signal charges; and
a differential processing unit adapted to perform a differential processing on output signals corresponding to signal charges in said plurality of photoelectric converters and output signals corresponding to a reset status and outputting signals obtained by the differential processing,
wherein said differential processing unit comprises:
a first holding capacitor that holds the output signals corresponding to the signal charges provided for an output line; and
a second holding capacitor that holds the output signals corresponding to said reset status provided for said output line,
wherein a plurality of difference signals between the signals held in said first and second holding capacitors are time-sequentially outputted,
said first and second holding capacitors for said output line are provided by each photoelectric converter of said plurality of photoelectric converters,
the output signals by each of said plurality of photoelectric converters are time-sequentially read out in parallel onto a plurality of common output lines, and
the number of said first and second holding capacitors for said output line are respectively the same as the number of photoelectric converters in said unit pixel.

* * * * *

UNITED STATES PATENT AND TRADEMARK OFFICE
CERTIFICATE OF CORRECTION

PATENT NO. : 7,189,951 B2  Page 1 of 1
APPLICATION NO. : 10/408300
DATED : March 13, 2007
INVENTOR(S) : Sakurai It is certified that error appears in the above-identified patent and that said Letters Patent is hereby corrected as shown below:

In Claim 4 (col. 9, line 51), replace "AID" with --A/D--.

In Claim 4 (col. 9, line 54), replace "AID" with --A/D--.

In Claim 7 (col. 10, line 22), replace "AID" with --A/D--.

In Claim 7 (col. 10, line 25), replace "AID" with --A/D--.

In Claim 11 (col. 11, line 4), replace "AID" with --A/D--.

In Claim 11 (col. 11, line 7), replace "AID" with --A/D--.

In Claim 14 (col. 11, line 42), replace "AID" with --A/D--.

Signed and Sealed this

Twenty-sixth Day of June, 2007

JON W. DUDAS
*Director of the United States Patent and Trademark Office*